United States Patent
Liu et al.

(10) Patent No.: US 10,805,928 B2
(45) Date of Patent: *Oct. 13, 2020

(54) COMMUNICATIONS IN A WIRELESS NETWORK FOR CARRIER SELECTION AND SWITCHING

(71) Applicant: Futurewei Technologies, Inc., Plano, TX (US)

(72) Inventors: Jialing Liu, Palatine, IL (US); Weimin Xiao, Hoffman Estates, IL (US); Qian Cheng, Aurora, IL (US)

(73) Assignee: Futurewei Technologies, Inc., Plano, TX (US)

( * ) Notice: Subject to any disclaimer, the term of this patent is extended or adjusted under 35 U.S.C. 154(b) by 49 days.

This patent is subject to a terminal disclaimer.

(21) Appl. No.: 16/036,015

(22) Filed: Jul. 16, 2018

(65) Prior Publication Data

US 2018/0324807 A1 Nov. 8, 2018

Related U.S. Application Data

(63) Continuation of application No. 14/975,522, filed on Dec. 18, 2015, now Pat. No. 10,028,279.

(60) Provisional application No. 62/094,822, filed on Dec. 19, 2014.

(51) Int. Cl.
| | | |
|---|---|---|
| *H04W 72/04* | (2009.01) | |
| *H04L 5/00* | (2006.01) | |
| *H04W 24/02* | (2009.01) | |
| *H04W 24/10* | (2009.01) | |

(52) U.S. Cl.
CPC .......... *H04W 72/0453* (2013.01); *H04L 5/00* (2013.01); *H04L 5/001* (2013.01); *H04L 5/0098* (2013.01); *H04W 24/02* (2013.01); *H04W 24/10* (2013.01); *H04W 72/042* (2013.01); *H04L 5/0057* (2013.01); *H04W 72/0426* (2013.01)

(58) Field of Classification Search
CPC . H04W 72/0453; H04W 24/10; H04W 24/02; H04L 5/0098; H04L 5/001; H04L 5/00
See application file for complete search history.

(56) References Cited

U.S. PATENT DOCUMENTS

| | | | |
|---|---|---|---|
| 10,028,279 B2* | 7/2018 | Liu | H04L 5/001 |
| 2011/0013550 A1* | 1/2011 | Wu | H04W 72/005 370/312 |

(Continued)

*Primary Examiner* — Christine Ng
(74) *Attorney, Agent, or Firm* — Slater Matsil, LLP

(57) ABSTRACT

Communications in a wireless network for carrier Selection and switching are provided. A terminal in the wireless network is simultaneously receiving data on at most m carriers. A base station in the wireless network sends an activation command associated with more than m carriers to the terminal. The terminal activates the more than m carriers. Then the base station selects a first subset from the activated carriers, and sends a first monitoring command associated with the first subset via a first physical-layer signaling to the terminal. When load and/or interference situations are changed, the base station selects a second subset from the activated carriers, and sends a second monitoring command associated with the second subset via a second physical-layer signaling to the terminal, wherein the first subset is different from the second subset.

26 Claims, 8 Drawing Sheets

(56) References Cited

U.S. PATENT DOCUMENTS

| | | | |
|---|---|---|---|
| 2011/0267978 A1* | 11/2011 | Etemad | H04L 5/003 370/254 |
| 2011/0292915 A1* | 12/2011 | Prakash | H04L 5/0064 370/336 |
| 2012/0014257 A1* | 1/2012 | Ahluwalia | H04W 48/12 370/241 |
| 2012/0213089 A1* | 8/2012 | Shi | H04L 5/001 370/241 |
| 2013/0322273 A1* | 12/2013 | Etemad | H04W 24/10 370/252 |
| 2014/0036889 A1* | 2/2014 | Kim | H04L 1/1854 370/336 |
| 2015/0016367 A1* | 1/2015 | Koskinen | H04L 5/001 370/329 |
| 2015/0245232 A1* | 8/2015 | Luo | H04L 27/0006 370/252 |
| 2017/0013490 A1* | 1/2017 | Lunttila | H04W 52/0206 |

* cited by examiner

COMMUNICATIONS IN A WIRELESS NETWORK FOR CARRIER SELECTION AND SWITCHING

RELATED U.S. APPLICATION

The present application is a continuation of U.S. patent application Ser. No. 14/975,522 filed on Dec. 18, 2015, now U.S. Pat. No. 10,028,279, and entitled "Communications in a Wireless Network for Carrier Selection and Switching", which claims priority to U.S. Provisional Application No. 62/094,822, entitled "Device, Network, and Method for Communications with Carrier Selection and Switching," filed on Dec. 19, 2014, all of which applications are hereby incorporated herein by reference.

TECHNICAL FIELD

The present disclosure relates to wireless communications, and, in particular embodiments, to communications in a wireless network for carrier selection and switching.

BACKGROUND

The wireless network includes terminals and base station. The terminal capability of aggregating spectrum resources for communications on all the resources at the same time is fundamentally limited, and is generally much smaller than the eNB capability of communication on possibly vast amount of spectrum resources.

Currently the amount of spectrum that a terminal may access at a time through carrier aggregation is limited to 100 MHz using five 20 MHz carriers. However, the eNB is expected to be able to support much wider bandwidth, e.g., 400+ MHz bandwidth (at the C-band), or 4 carriers with each 2.16 GHz wide (at 60 GHz, similar to IEEE 802.11ad).

SUMMARY

Embodiments of the present disclosure provide device, network, and method for communications with carrier selection and switching.

In an embodiment, a base station in a wireless network sends an activation command associated with more than m carriers to a terminal in the wireless network, wherein the terminal is capable of simultaneously receiving data on at most m carriers. The base station selects a first subset from the more than m carriers, and sends a first monitoring command associated with the first subset of the more than m carriers via a first physical-layer signaling to the terminal, wherein a number of the carriers in the first subset is less or equal to m. When load and/or interference situations are changed, the base station selects a second subset from the activated carriers, and sends a second monitoring command associated with the second subset via a second physical-layer signaling to the terminal, wherein a number of the carriers in the second subset is less or equal to m, and the first subset is different from the second subset.

In another embodiment, a terminal in a wireless network receives an activation command associated with more than m carriers from a base station in the wireless network, wherein the terminal is capable of simultaneously receiving data on at most m carriers. The terminal activates the more than m carriers in accordance with the activation command, receives a first monitoring command associated with a first subset of the activated carriers via a first physical-layer signaling from the base station, and monitors the carriers in the first subset of the activated carriers to receive data, wherein a number of carriers in the first subset is less than or equal to m. Then, the terminal receives a second monitoring command associated with a second subset of the activated carriers via a second physical-layer signaling from the base station, and monitors the carriers in the second subset of the activated carriers to receive data, wherein a number of carriers in the second subset is less than or equal to m, and the first subset is different from the second subset.

In general, embodiments according to the present disclosure realize extension of the framework beyond m carriers, moreover, configuring more carriers potentially to be used allows access to more carriers over time and better carrier utilization.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of embodiments of this disclosure are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

In a modern wireless communications system, such as a Third Generation Partnership Project (3GPP) Long Term Evolution (LTE) compliant communications system, a plurality of cells or evolved NodeBs (eNB) (also commonly referred to as NodeBs, base stations (BSs), base terminal stations, communications controllers, network controllers, controllers, access points (APs), and so on) may be arranged into a cluster of cells, with each cell having multiple transmit antennas. Additionally, each cell or eNB may be serving a number of users (also commonly referred to as terminals or User Equipments (UEs), wireless devices, mobile stations, users, subscribers, terminals, and so forth) based on a priority metric, such as fairness, proportional fairness, round robin, and the like, over a period of time. It is noted that the terms cell, transmission points, and eNB may be used interchangeably. Distinction between cells, transmission points, and eNBs will be made where needed.

Figure 1A:
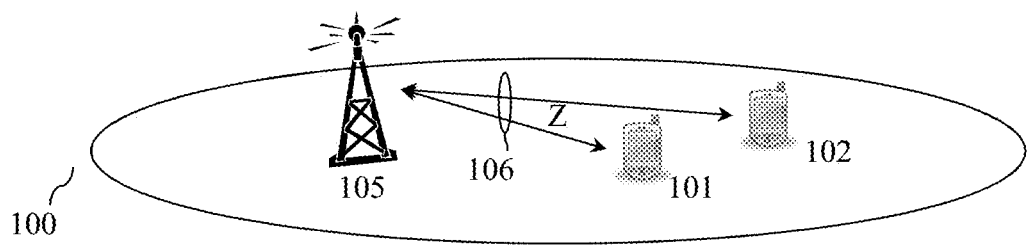
FIG. 1A illustrates cellular communications in a macro cell.

As shown in FIG. 1A, system 100 is a wireless network with a communications controller 105 communicating using a wireless link 106 to a first wireless device 101 and a second wireless device 102. The wireless link 106 can comprise a single carrier frequency such as used for a time division duplex (TDD) configuration or a pair of carrier frequencies as used in a frequency division duplex (FDD) configuration. While not depicted in FIG. 1, the system 100 may include other network elements used to support the communications controller 105 such as a backhaul, management entities, etc. The transmission/reception from controller to a terminal is called downlink (DL) transmission/reception, and the transmission/reception from a terminal to a controller is called uplink (UL) transmission/reception.

Figure 1B:
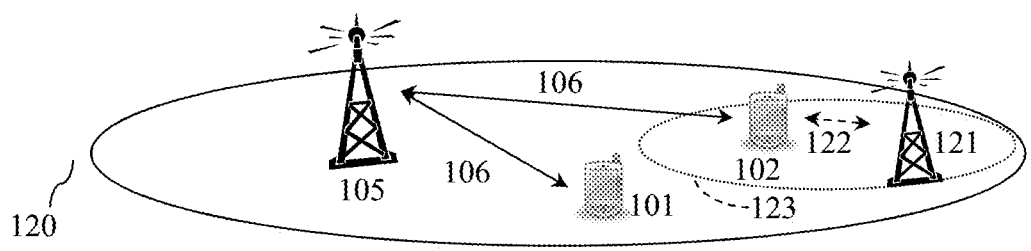
FIG. 1B illustrates cellular communications in a heterogeneous network with a macro cell and a pico cell.

As shown in FIG. 1B, system 120 is a wireless heterogeneous network (HetNet) with communications controller 105 communicating to wireless device 101 using wireless link 106 (solid line) and to wireless device 102 using wireless link 106. A second communications controller 121, such as a pico cell, has a coverage area 123 and is capable of communicating to wireless device 102 using wireless link 122. Wireless link 122 and wireless link 106 use the same carrier frequency, but wireless link 122 and wireless link 106 can use different frequencies. There may be a backhaul (not shown) connecting communications controller 105 and communications controller 121. A HetNet may include a macro cell and a pico cell, or generally a higher power node/antenna with a larger coverage and lower power node/antennas with a smaller coverage. Lower power nodes (or lower power points, picos, femtos, micros, relay nodes, remote radio heads (RRHs), remote radio units, distributed antennas, etc.) generally are low-power wireless access points that operate in a licensed spectrum. Small cells may use lower power nodes. Lower power nodes provide improved cellular coverage, capacity and applications for homes and businesses, as well as metropolitan and rural public spaces.

In a network such as system 120 in FIG. 1B, there may be multiple macro points 105 and multiple pico points 121 operating with multiple component carriers, and the backhaul between any two points can be fast backhaul or slow backhaul depending on the deployment. When two points have fast backhaul, the fast backhaul may be fully utilized, e.g., to simplify the communication method and system or to improve coordination. In a network, the points configured for a terminal for transmission or reception may include multiple points, some pairs of points may have fast backhaul, but some other pairs of points may have slow backhaul or any backhaul.

In a deployment, an eNodeB may control one or more cells. Multiple remote radio units may be connected to the same base band unit of the eNodeB by fiber cable, and the latency between base band unit and remote radio unit is quite small. Therefore the same base band unit can process the coordinated transmission/reception of multiple cells. For example, the eNodeB may coordinate the transmissions of multiple cells to a terminal, which is called coordinated multiple point (CoMP) transmission. The eNodeB may also coordinate the reception of multiple cells from a terminal, which is called CoMP reception. In this case, the backhaul link between these cells with the same eNodeB is fast backhaul and the scheduling of data transmitted in different cells for the terminal can be easily coordinated in the same eNodeB.

As an extension of the HetNet deployment, possibly densely deployed small cells using low power nodes are considered promising to cope with mobile traffic explosion, especially for hotspot deployments in indoor and outdoor scenarios. A low-power node generally means a node whose transmission power is lower than macro node and BS classes, for example Pico and Femto eNB are both applicable. Small cell enhancements for E-UTRA and E-UTRAN, which is an ongoing study in 3GPP, will focus on additional functionalities for enhanced performance in hotspot areas for indoor and outdoor using possibly densely deployed low power nodes.

Figure 1C:
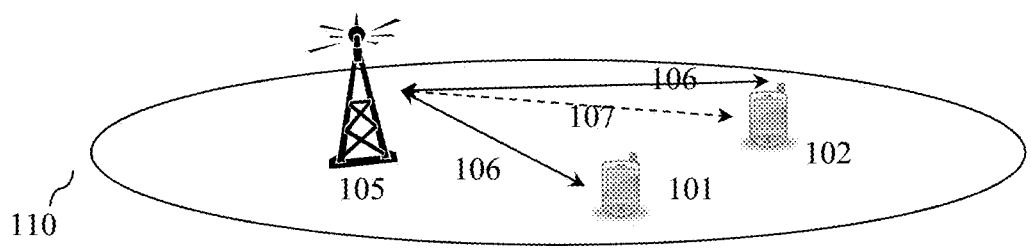
FIG. 1C illustrates cellular communications in a macro cell with carrier aggregation.

As shown in FIG. 1C, system 110 is a wireless network configured with carrier aggregation (CA) where communications controller 105 communicates to wireless device 101 using wireless link 106 (solid line) and to wireless device 102 using wireless link 107 (dashed line) and wireless link 106. In some example deployments, for wireless device 102, wireless link 106 can be called a primary component carrier (PCC) while wireless link 107 can be called a secondary component carrier (SCC). In some carrier aggregation deployments, the PCC can be provided feedback from a wireless device to a communications controller while the SCC can carry data traffic. In the 3GPP Rel-10 specification, a component carrier is called a cell. When multiple cells are controlled by a same eNodeB, cross scheduling of multiple cells is possible to be implemented because there may be a single scheduler in the same eNodeB to schedule the multiple cells. With CA, one eNB may operate and control several component carriers forming primary cell (Pcell) and secondary cell (Scell). In the downlink, the carrier corresponding to the PCell is the Downlink Primary Component Carrier (DL PCC) while in the uplink it is the Uplink Primary Component Carrier (UL PCC). Depending on UE capabilities, Secondary Cells (SCells) can be configured to form together with the PCell a set of serving cells. In the downlink, the carrier corresponding to an SCell is a Downlink Secondary Component Carrier (DL SCC) while in the uplink it is an Uplink Secondary Component Carrier (UL SCC). In Rel-11 design, an eNodeB may control both a Macro cell and a Pico cell. In this case, the backhaul between the Macro cell and the Pico cell is fast backhaul. The eNodeB can control the transmission/reception of both macro cell and Pico cell dynamically.

Figure 1D:
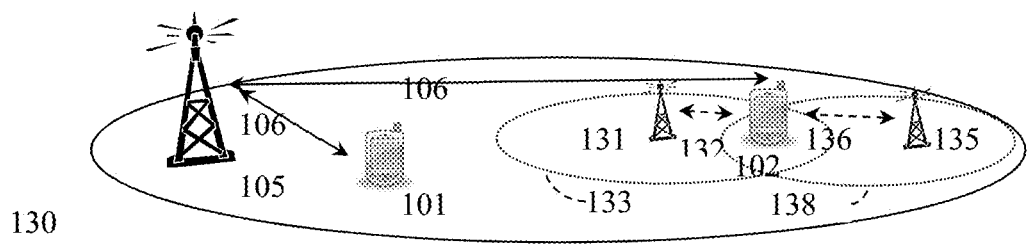
FIG. 1D illustrates cellular communications in a heterogeneous network with a macro cell and several small cells.

As shown in FIG. 1D, system 130 is a wireless heterogeneous network with communications controller 105 communicating to wireless device 101 using wireless link 106 (solid line) and to wireless device 102 using wireless link 106. A second communications controller 131, such as a small cell, has a coverage area 133 and is capable of communicating to wireless device 102 using wireless link 132. A communications controller for another small cell 135 has coverage area 138 and uses wireless link 136. Communications controller 135 is capable of communicating to wireless device 102 using wireless link 136. Coverage areas 133 and 138 may overlap. The carrier frequencies for wireless links 106, 132, and 136 may be the same or may be different.

Figure 1E:
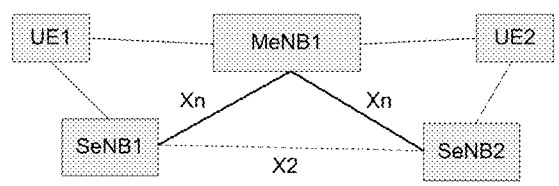
FIG. 1E illustrates an example dual connectivity scenario.

FIG. 1E shows a system configured for dual connectivity. A master eNB (MeNB) is connected to one or more secondary eNBs (SeNBs) using an interface such as the Xn interface (Xn can be X2 in some specific cases). The backhaul can support this interface. Between the SeNBs, there may be an X2 interface. A terminal, such as UE1, is connected wirelessly to MeNB1 and SeNB1. A second terminal, UE2, can connect wirelessly to MeNB1 and SeNB2.

A reference signal and other signals, such as a data channel, e.g. physical downlink shared channel (PDSCH), and a control channel, e.g. physical downlink control channel (PDCCH), are orthogonal and multiplexed in different resource elements in time-frequency domain. Further, the signals are modulated and mapped into resource elements. Each resource block (RB) contains a number of REs. In Rel-10, channel status indicator reference signal (CSI-RS) is introduced in addition to CRS and DMRS. CSI-RS is used for Rel-10 UEs to measure the channel status, especially for multiple antennas cases. PMI/CQI/RI and other feedback may be based on the measurement of CSI-RS for Rel-10 and beyond terminal. PMI is the precoding matrix indicator, CQI is the channel quality indicator, and RI is the rank indicator of the precoding matrix. There may be multiple CSI-RS resources configured for a terminal.

If the wireless device knows the cell id, cyclic prefix, and location of subframe 0, the wireless device can make measurements on the CRS in subframes 0 and 5 as shown in step 315. Example measurements are the reference signal received power (RSRP), the received signal strength indicator (RSSI), and the reference signal received quality (RSRQ). The CRS can be used to improve frequency and timing synchronization.

Figure 2:
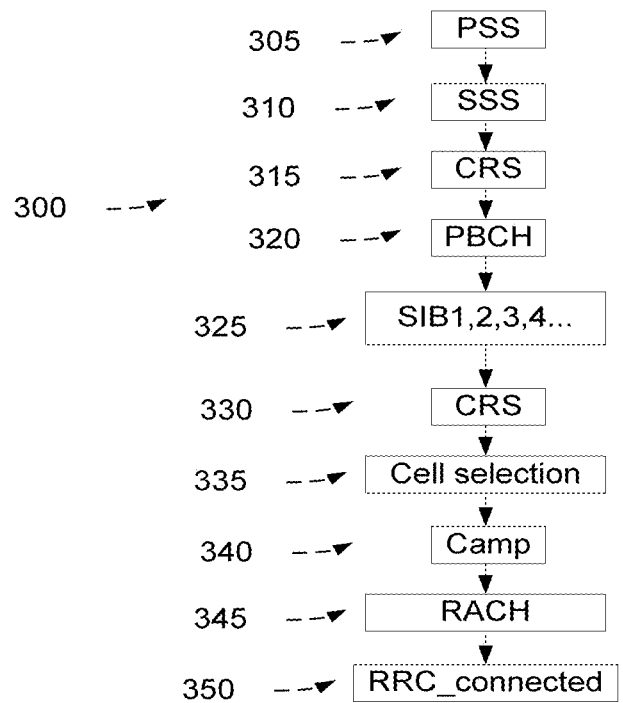
FIG. 2 illustrates an example of a wireless device performing synchronization and measurement using reference signals.

The steps in FIG. 2 show how the terminal can become assigned to an eNB. In step 325, the terminal listens to system information broadcast (SIB) messages, such as SIB1, SIB2, etc. To listen to SIB messages, the terminal receives the PDCCH to process the downlink control information (DCI) to obtain the modulation, coding, etc. information for the PDSCH carrying the SIB message. In step 330, the terminal may process more CRS for measurement purposes. In step 335, the terminal may compare cells in one or more carriers and select a suitable one. In step 340, the terminal may decide to camp on this carrier. In step 345, the terminal may begin the random access procedure by transmitting the random access channel (RACH) on the uplink in order to enter the RRC_CONNECTED state in step 350. There may be a message exchange in step 350 between the terminal and eNB. Terminals have two states: RRC_CONNECTED and RRC_IDLE; the term "connected" can represent RRC_CONNECTED while "idle" can represent "RRC_IDLE.

In parallel with increasing the network resources by densifying the network, another way to increase the network resources is to utilize more and more usable spectrum resources, which include not only the licensed spectrum resources of the same type as the macro, but also the licensed spectrum resources of different type as the macro (e.g., the macro is a FDD cell but a small cell may use both FDD and TDD carriers), as well as unlicensed spectrum resources and shared spectrums, and even high-frequency spectrum at millimeter wavelength (mmWave, mm wave, or mm-wave, mmW, etc.) range. The unlicensed spectrums can be used by generally any user, subject to regulation requirements. Traditionally the unlicensed spectrums are not used by cellular networks as it is generally difficult to ensure quality of service (QoS) requirements. Operating on the unlicensed spectrums mainly include wireless local area networks (WLAN), e.g. the Wi-Fi networks. Due to the fact that the licensed spectrum is generally scarce and expensive, utilizing the unlicensed spectrum by the cellular operator may be considered. The usable spectrum resources on the unlicensed spectrum, shared spectrum, and mmWave spectrum are vast, sometimes in hundreds of MHz bandwidth, and hence they should be considered for future systems. Note that on high-frequency bands and unlicensed/shared-licensed bands, TDD is used and hence the channel reciprocity can be exploited for the communications.

For operations on the unlicensed bands, regulatory requirements for ensuring coexistence of different radio access technologies (RATs) need to be met. To meet these regulatory requirements, the transmissions on the unlicensed spectrum cannot be continuous or persistent in time. Rather, on/off, or opportunistic transmissions and measurements on demand may be adopted.

In addition, for operations in high-frequency bands, especially in the bands at 28 GHz to 60 GHz (or even up to 73 GHz and higher), they generally belong to the mmWave regime, which has quite different propagation characteristics from microwave (generally below 6 GHz). For example, mmWave experiences higher pathloss over distance than microwave does. Currently most of the mmWave bands are not assigned as dedicated licensed carriers for cellular communications, but some of the bands can be usable by cellular as unlicensed carriers. In future more and more mmWave bands may be usable by cellular, either as unlicensed carriers or licensed carriers.

Thus, it can be seen that when considering further evolution of the small cell networks, the main scenarios may be small cell networks with abundant resources in both node-density dimension and spectrum dimension, though in some scenarios the abundant resources may exist in either the node-density dimension or the spectrum dimension. The spectrum resources may be in low-frequency (sub-3 GHz or sub-6 GHz, e.g., the C-band) and/or high frequency (above 6 GHz or even above 28 GHz), and/or in unlicensed/shared-licensed/licensed bands. Specifically, the case where LTE operating on unlicensed spectrum is called unlicensed LTE (U-LTE) or LTE on unlicensed (LTE-U) or licensed-assisted access using LTE (LAA-LTE). In these scenarios, the small cells are generally densely overlaid with wider-area macro cells. Such scenarios may be called hot areas, which indicate enlarged areas as compared to hot spots. Such hot areas are generally deployed and controlled by the network operators. For such hot areas, discontinuous, opportunistic, or on-demand transmissions (and reception) and measurements (of signals and/or various types of interference) on flexibly selected node resources and frequency resources are needed.

Some issues may arise in these scenarios and need to be considered:

In the wider spectrum scenario, the operations on wider spectrum by the eNB and possibly by the terminal need to be supported. Furthermore, with the significantly increased spectrum resource, turning ON the entire spectrum all time for all transmissions may be not only inefficient (e.g., due to interference) but also infeasible for some cases. This is not a new issue, but it may become more exacerbated moving forward as more and more spectrum resources are expected to be incorporated. Opportunistic access to a selected subset of the available wide-spectrum resource with properly coordinated adaptation should be considered.

Figure 3:
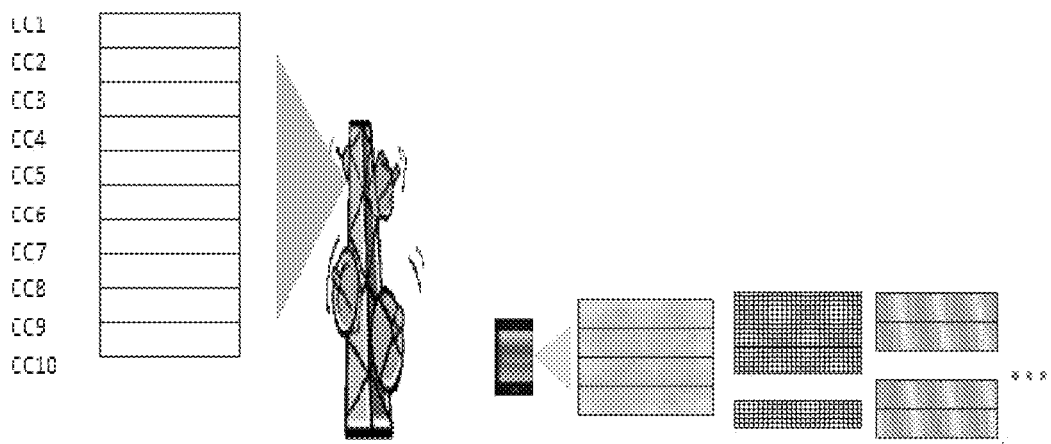
FIG. 3 illustrates an example of eNB has more supportable carriers than a terminal.

With new applications requiring higher throughputs, increasing the number of aggregated carriers at a terminal can meet the throughput requirements. In general, this would require higher terminal capability in terms of the number of RF chains and baseband processing power. However, with large chunks of contiguous spectrum becoming available within one band, the number of RF chains may be maintained at a reasonable level to support a larger number of carriers within a limited number of bands. Moreover, baseband processing power is expected to continuously improve in the near future to allow the terminal to support more (e.g., >=10) carriers. Such carrier aggregation of a massive number of carriers may be called Massive CA (MCA). MCA is not limited to small cells, though it may be the case for unlicensed spectrum. Nevertheless, the terminal capability of aggregating the spectrum resources for communications on all the resources at the same time is fundamentally limited. This is illustrated in FIG. 3, where the eNB is assumed to have 10 carriers (CC1 to CC10), and the terminal can support at most 4, though the 4 CCs may not need to be fixed.

Aspects of this disclosure allow the network/terminal to better utilize the large number of carriers available at the eNB, without significantly increasing terminal capability requirements. Specifically, adaptive resource selection is used in both large and small time scales to achieve dynamic carrier switching/selection, which may allow the terminal to utilize a large number of carriers over a sequence of periods. For example, coupling fast on/off with fast SCell activation/deactivation can allow a terminal to switch carriers quickly. Other operational impacts can include load shifting/balancing to improve throughputs and reduce interference. Having a large pool of usable carriers can enable these improvements in operation. This ability to switch quickly also has benefits for operation in unlicensed bands as means to select lightly occupied carriers when interference arises dynamically. This approach can potentially be beneficial to terminals to use a massive number of carriers available at the eNB without largely increasing their capability requirements.

Figure 4:
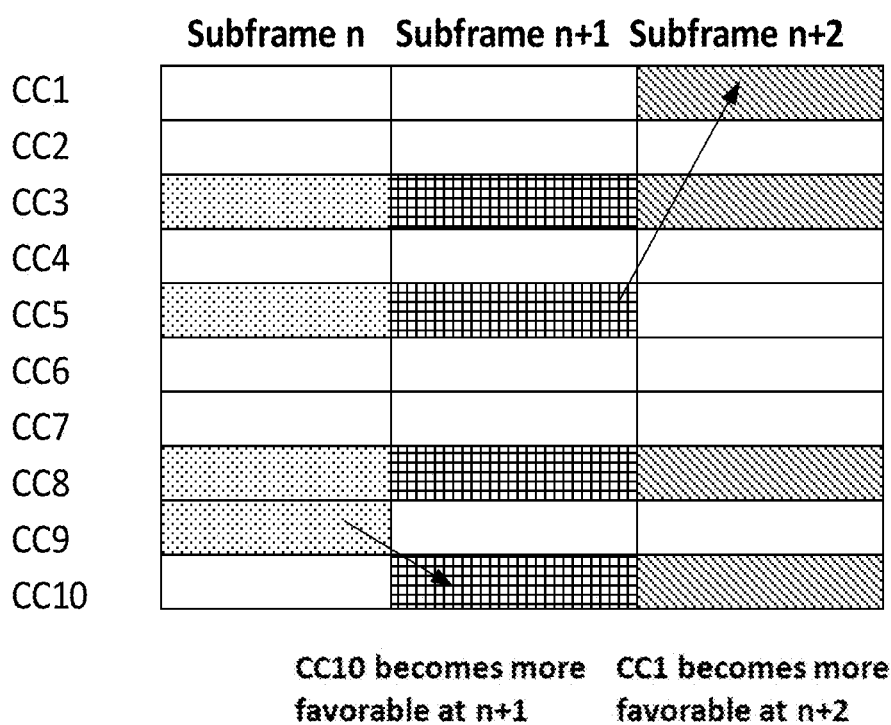
FIG. 4 illustrates an example of carrier selection operation.

An example of the general idea of the carrier switching/selection is illustrated in FIG. 4. Suppose at subframe n, the terminal is assigned to CCs 3, 5, 8, 9. This is within the terminal capability. However, at subframe n+1, the load and/or interference situations may be changed. For example, CC9 may be required to support another terminal, such as a terminal without CA capability. Then the eNB may move the terminal out of CC9. For another example, CC9 may experience significant interference from a neighboring cell, as the neighbor will transmit on CC9, and this information is exchanged via backhaul so that the eNB knows. In any of those events, the eNB may determine that CC10 is becoming more favorable for the terminal than CC9 at subframe n+1. Then the eNB indicates the terminal that the terminal shall immediately switch from CC9 to CC10 and receive data on CC10. The eNB may make another decision at subframe n+2. Note that this is only one example of the carrier selection/switching. Although it illustrates the case where the terminal is asked to switch carriers at a subframe level, it does not have to be so frequent or so fast. In general, the switching may be done once a few subframes, or tens or hundreds of subframes, etc.

There are a few elements that are essential to the effectiveness of the carrier switching/selection. In one implementation, the terminal is required to maintain connections to many system carriers, or even all carriers. Maintaining connections to the carriers does not require very accurate tracking or measurements. Coarse tracking and radio resource management (RRM) measurements (based on discovery reference signal (DRS) or aperiodic DRS on demand) may be sufficient. The measurements may be done only in configured measurement gap, or per network request. The periodic measurement gap may or may not be sufficient for the terminal to perform RRM measurements and coarse tracking on all the carriers without long delay, but aperiodic gap may be signaled by the eNB to the terminal to perform the coarse tracking or RRM measurement; of course the eNB needs to transmit the associated reference signal (RS) (e.g. DRS) accordingly in the aperiodic gap. This may be useful for the cases with a massive number of carriers, or some carriers lie in the unlicensed band which cannot transmit periodic RS.

In another implementation, the terminal may need to maintain a more accurate tracking and channel status indicator (CSI) measurements for a number of carriers outside the ones on which the terminal receives data. To monitor these carriers may be within the terminal capability or beyond the terminal capability. In the latter case, the terminal may need to utilize measurement gaps. The measurement gaps for CSI may not be the same as RRM measurement gaps. If both gaps are configured as periodic, RRM gaps may be configured as a subset of the CSI gaps, i.e., RRM gaps may have longer periodicity than CSI gaps but RRM gaps are part of the CSI gaps. The CSI gaps may also be aperiodic, triggered by physical-layer signaling such as DCI or Layer 1. When such a trigger is received, the terminal switches to the carriers indicated by the DCI and performs CSI measurements. The trigger may be a newly designed trigger, or may reuse the CSI request trigger for aperiodic reporting. In other words, if the terminal receives a CSI request trigger associated with carriers not currently monitored, the terminal understands that in the next few subframes no reception (or transmission) associated with non-triggered carriers will occur, and it switches to the triggered carriers which will transmit RS (and IMR) for CSI measurement, and the terminal will report CSI to the network based on standardized reporting timing and resources, and finally the terminal switches back to the carriers before the trigger. Carrier groups associated with aperiodic reporting can be reused here. In another embodiment, however, the terminal categories are further classified as "simultaneous receiving capability" and "simultaneous tracking/measuring capability". The simultaneous receiving capability may be, say, 5, which may be determined by the terminal RF and ADC/baseband limitations, whereas the simultaneous tracking/measuring capability is generally larger, say, 8, which may be determined mainly by the terminal RF limitations. In this case, a measurement gap is not necessary for the terminal to keep track of 8 carriers' timing and CSI. The terminal capability of simultaneous receiving/decoding, and the terminal capability of simultaneous tracking/measuring, should be reported to the network, and the network should perform carrier selection/switching accordingly. Moreover, the terminal capability may also include another category of "control channel monitoring capability", which is generally no greater than the simultaneous tracking/measuring capability but no less than the simultaneous receiving capability. This capability is mainly associated with terminal's capability of simultaneous receiving and decoding (E)PDCCH on multiple carriers and buffering data, and may also be reported to the network and/or configurable by the network. Similarly, there may also be a terminal capability of performing fine tracking and CSI reporting on a number of carriers. The CSI measurements may be based on one or more of CRS, periodic/aperiodic DRS, CSI-RS, or newly introduced RS.

In another implementation, the terminal, and/or other terminals, and/or the network, should keep track of the network interference levels across different carriers. The interference may be from the same operator or same RAT, or from different RATs such as WiFi on the unlicensed. CSI and interference measurement resource (IMR) configurations can be used for the terminal to measure and report; generally carrier-level wideband (as opposed to narrow band) CSI reporting should be sufficient. The network may also blank on certain time/frequency resources to determine the interference levels. Terminal's other feedback, such as Ack/Nack, can also be used by the network to determine if a carrier is favorable or not. The network can also rely on backhaul information exchange about loading/scheduling decisions to anticipate the interference level. In other words, carrier-level usage information (of a number of quantized levels) may be exchanged. The network can configure the terminals to measure CSI with or without a certain interference (via proper IMRs) from a cell, thus, the network can know the actual interference levels if the carrier-level usage information is given. For example, when without interference, the reported CQI is x (in linear scale), and with full interference, the reported CQI is y (in linear scale); then if the carrier-level usage information indicates about z (a fraction) usage, the eNB can estimate that the actually CQI should be about $1/(1/x+z(1/y-1/x))$ (linear scale).

In another implementation, intra/inter-band cases may be considered. In the intra-band contiguous cases, the fine timing/channel strength, etc., can be derived reliably from the intra-band carriers, and the terminal/network may mainly keep track of the interference/loading to determine the carrier selection/switching. The intra-band non-contiguous case may be generally similar to the intra-band contiguous ones, but if the timing difference is considerable, additional tracking (e.g., with longer tracking time, or with enhanced RS providing more processing gains) may be helpful. Tracking techniques are described by U.S. patent application Ser. No. 62/056,334 and U.S. patent application Ser. No. 62/038,754, which are incorporated by reference herein as if reproduced in their entireties.

The channel strength may be computed by the terminal based on the frequency difference, as different carriers should experience the same propagation within one band. However, the terminal may be monitoring the entire band and have the capability of processing the entire band, or the terminal may have to filter out those carriers not in use and only process used carriers in the band. In the latter case, further transition is needed, such as the terminal adjusts its filters according to the used carriers. In the inter-band cases, generally the channel conditions/fine tracking in one band cannot be derived from the carriers in other bands, but the terminal has separate RF to cover the bands; therefore, the terminal should be able to monitor carriers on the bands at the same time, though additional tracking is needed.

It may be overwhelming to a terminal when the number of reselected carriers exceeds a limit, if the terminal needs to perform operations for the transitions introduced by the switching. To address this, the network may limit the number of switchable carriers at a time to certain number, say, 3. Namely, at one time, the network may ask a terminal to change at most 3 component carriers, and then the terminal may need to complete the transitions for the 3 carriers at the same time. This limit is smaller than terminal simultaneous receiving capability. This limit may be reported by the terminal to the network as it may be a terminal capability issue, and/or it may be configured by the network. This idea can be generally applicable to any switching, including switching carriers for RRM measurements, PDCCH monitoring, etc.

In other words, the network may adaptively select a subset of cell and/or carrier resources to be used for a terminal. As there are more node resources and spectrum resources to be included in the network, from the terminal perspective, it can discover multiple "cells" (a licensed component carrier, or CC, is generally viewed as a cell according to carrier aggregation; other nodes or carriers may be viewed as virtual cells or generalized cells with virtual cell IDs which may or may not be related to physical cell IDs). These cells may be configured for the terminal (in slow time scale, for example), but not all will be used. The network selects a subset of the cells and signals to the terminal (e.g., via radio resource control (RRC) or medium access control (MAC) signaling, or via physical layer signaling for fast response). If a cell is not selected for any terminal, it may be turned off and transmit only in a discovery burst (discovery RS burst, or DRS burst). If a cell is selected, the cell has to be on or turned on. The transition time is desirable to be as short as possible. In one embodiment, the bandwidth/carrier(s) of a cell is not predetermined, but determined when it is selected for use or determined on the fly of the transmissions. For example, the cell and/or the terminal may sense the usage of the spectrum and then decide on a portion of the spectrum which is less occupied.

In addition, it should be noted that the terminal generally has a Pcell anchored in lower frequency with a macro or micro cell, and it does not switch the Pcell frequently.

The carrier selection/switching may be used with fast on/off, semi-static (slow) on/off, or no on/off.

Network adaptation, or adaptive transmission, has been studied in 3GPP, such as small cell on/off based on existing procedures. However, the main focuses have been reusing existing procedures, such as handover, Scell activation/deactivation, and dual connectivity procedures, to achieve small cell on/off in semi-static time scales. The on/off may be in a couple tens of milliseconds to hundreds of milliseconds. Faster or more dynamic on/off, or highly opportunistic transmission/reception/measurements with reduced on/off transition times (transition delays) are highly desirable, as they offer even higher performance gains and it is potentially necessary for U-LTE support and mmWave opportunistic usage. Thus, procedures and designs to support dynamic on/off at any time are desired. Generally, such cells may be activated Scells. In some cases, the cells can just be a configured Scell, activated or deactivated.

Figure 5:
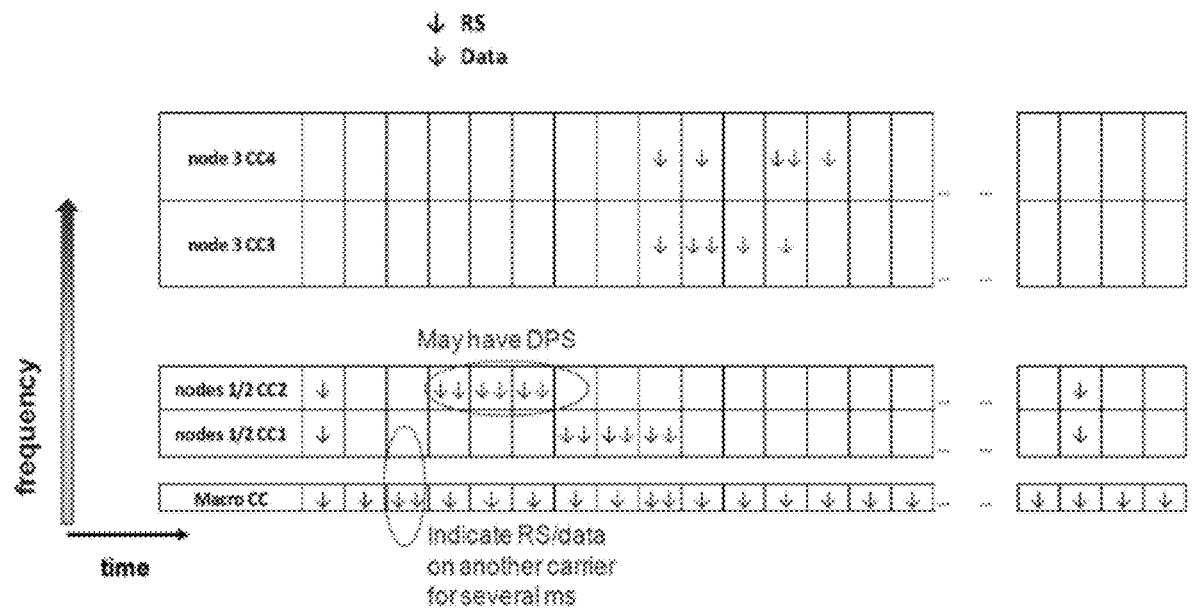
FIG. 5 illustrates an example of adaptive resource selection and opportunistic transmission/measurements.

FIG. 5 shows an example of adaptive resource selection and opportunistic transmission/measurements. The macro carrier normally acts as the Pcell, and does not turn off. It transmits CRS and other common channels regularly. The terminal generally always monitors the macro CC for CRS, common channels, signaling related to other CCs, and possibly data. Besides the macro CC, the terminal has discovered a number of cells (e.g., by DRS) and some of them may be configured to the terminal as possible transmission points. Node1 and node2 may be small cell operating in licensed spectrum, and each may have more than one CC, e.g., CC1 and CC2. They may be connected via fast backhaul. They may transmit DRS regularly with long duty cycles. They may be turned off in non-DRS burst unless a measurement/transmission is needed. For example, the macro may indicate that in a next subframe (with delay of 0 subframe, 1 subframe, or more subframes), node 1 and/or node 2 may transmit RS and/or data in CC1/CC2. Then the nodes may be turned on and the terminal starts to monitor and feedback CSI reports. Note that the turning on/off mentioned above may be fast on/off or semi-static on/off, where fast on/off can further reduce interference in the network by reducing the amount of overhead transmissions.

Thus, the carrier selection/switching, especially the fast carrier selection/switching, may help realize the benefits from small cell deployments, though (fast) load balancing/shifting across carriers, (fast) interference coordination and avoidance across carriers, etc. These aspects are especially important to denser networks, hot areas, and/or networks with abundant spectrum resources, as in these networks, the traffic loads are highly dynamic in time and vary significantly in space, and hence the system should adapt accordingly, mainly via load balancing/shifting across carriers, interference coordination and avoidance across carriers, etc.

An algorithm used in an embodiment for fast carrier selection is described as follows. Suppose the terminal may receive from two CCs (component carriers) at a time, and one is anchored on the PCC or Pcell. The other carrier may be used for performing fast carrier selection/switching. The eNB has N CCs. Then, when a file arrives and needs to be sent to the terminal, the cell calculates $t_1, t_2, \ldots, t_N$, the times needed for the file to be completed on $CC_1$, $CC_2, \ldots, CC_N$. The time includes queue time and transmission time. These times are different due to different interference and different loads at each CC. Then the cell picks the ith CC for the file if $t_i$ is the smallest. Then the cell immediately tells the terminal to go to $CC_i$, and the terminal does so, and the cell immediately transmits on the corresponding $CC_i$. In other words, the fast carrier selection/switching may be based on a heuristic algorithm of minimum packet completion time. Further enhancements are possible for fast carrier selection.

When carrier selection/switching is used, a HARQ process may need to be completed across multiple carriers. This is discussed in U.S. patent application Ser. No. 62/031,656, which is incorporated by reference herein as if reproduced in its entirety.

Figure 6:
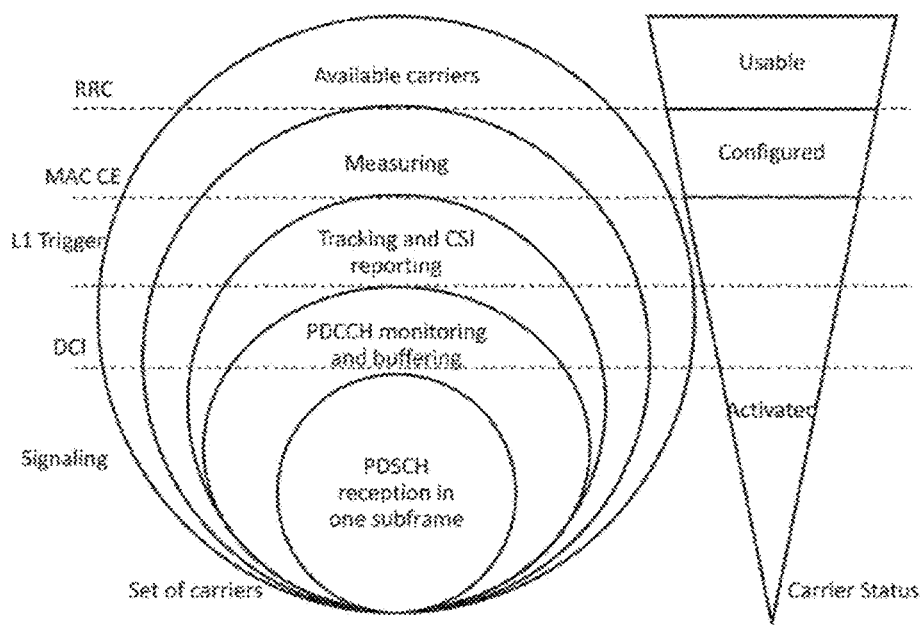
FIG. 6 illustrates an example of carrier selection design.

FIG. 6 illustrates a design for carrier selection. All the carriers available at the eNB can potentially be usable for a terminal, even if the terminal capability of receiving or monitoring is much smaller. A subset of the available or usable carriers may be configured to a terminal. The configuration signaling is an RRC signaling, based on existing Scell addition/removal signaling, and generally the time scales are a few tens of milliseconds to about a hundred milliseconds for the configuration. The terminal needs to maintain connections with the carriers, e.g., performs RRM measurements based on reference signals and/or synchronization signals (e.g. DRS) for these carriers. The terminal can also achieve coarse time/frequency synchronization with these carriers.

Furthermore, a subset of the configured carriers may be activated (or deactivated) via MAC control elements in MAC signaling. This can be similar to Scell activation/deactivation MAC signaling, whose time scales are about a few milliseconds. For an activated carrier, the terminal needs to perform fine tracking and CSI reporting, so that the carrier may be ready for control channel monitoring at any time when the network signals to do so. The fine tracking and CSI reporting may be based on CRS and/or CSI-RS, or some RS with higher density than DRS used for RRM measurements.

A number of the activated carriers may be required to monitor (E)PDCCH and buffering for potential data transmissions. This may be triggered by a physical-layer signaling such as a Layer 1 signaling, from either the Pcell or another cell for cross-carrier scheduling, or from the same cell for self-scheduling. Any of these carriers may be carrying PDSCH data to this terminal at any time, but the total number of carriers that actually carry PDSCH at the same time may be limited to a smaller number which is determined by the terminal's simultaneous data receiving capability. This is ensured by the eNB scheduler. Carrier(s) carrying PDSCH can be known from PDCCH DCI decoding results.

The above description based on FIG. 6 is only one embodiment of the carrier selection design. Other embodiments can be provided. For example, the carrier may have only two states from a terminal perspective, Rx-ready state or monitoring-only state, and the terminal can transition between the states quickly based on network signaling. In the Rx-ready state, the terminal is fine synchronized, and monitors the PDCCH and buffers every subframe. In the monitoring-only state, the terminal is coarse synchronized, and measures and reports RRM. The transition time may be used to establish fine synchronization, CSI measurements, etc., based on enhanced RS. This approach may have longer transition times than the previous approach, but the carrier states seen from the terminal are simplified.

In general, the network and terminal become more opportunistic in their transmission and receiving, with the introduction of on/off and carrier selection/switching.

Compared with other techniques that addresses network coordination and interference management, the proposed carrier-based coordination and interference management are advantageous in several senses. For example, existing ICIC not relying on carrier based coordination cannot enable carrier on/off, cell on/off, cell/carrier-level power control (as power control of the common/control channels, e.g., CRS cannot be done in ICIC or eICIC, etc.), whereas the carrier-level coordination and interference management can support these. ICIC also requires tight coordination and synchronization across different sites and carriers as they allow intra-carrier coordination only, e.g., RB level, and to distinguish the RBs synchronization is needed; while the carrier-level coordination and interference management work well with only loose coordination and no synchronization. The carrier-level coordination and interference management also extend to LAA-LTE or unlicensed LTE very well, as in the unlicensed case, the cell is required to transmit or mute on the whole bandwidth. Additionally, it extends to very large spectrum resources well, since in the scenarios where the network has a massive number of carriers, it is more effective to perform carrier-level coordination, as opposed to, say, RB-level, etc.

Figure 7:
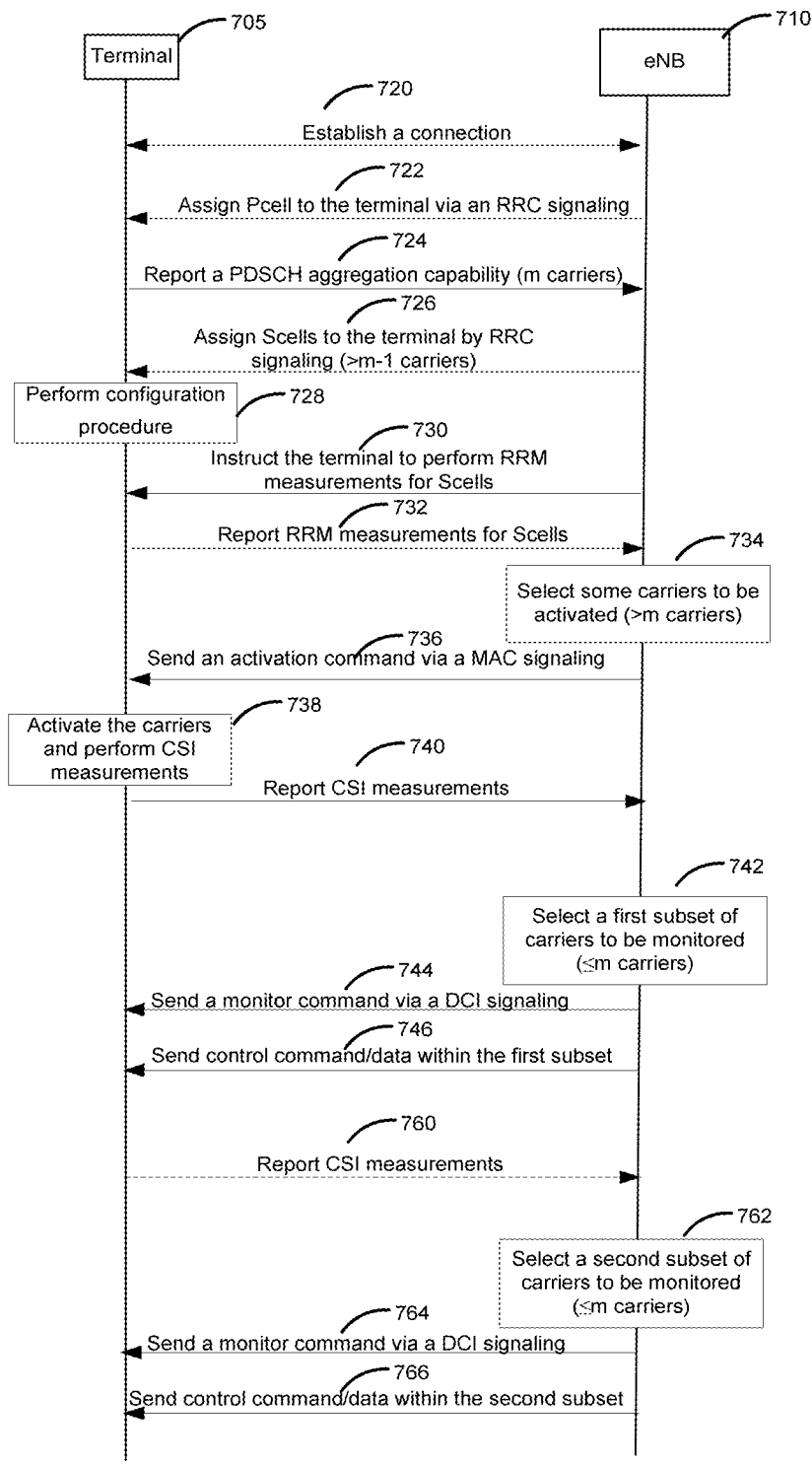
FIG. 7 illustrates a message exchange and processing diagram 700 highlighting an example design of carriers selection and switching.

FIG. 7 illustrates a message exchange and processing diagram 700 highlighting an example design of carriers selection and switching. The diagram 700 includes messages exchange and processing by a terminal 705 and an eNB 710. In this example, assuming terminal 705 is capable of simultaneously receiving data on at most m carriers. In FIG. 7, eNB 710 and terminal 705 establish a connection to each other at step 720. And then, eNB assigns available carries to terminal. All the carriers available at the eNB can potentially be usable for a terminal, even if the terminal's capability of receiving or monitoring is much smaller. Such as, eNB 710 assigns a Pcell to the terminal at step 722, and assigns Scells to the terminal at step 726. At step 722, eNB 710 may use an RRC configuration signaling to configure the Pcell. For example, the Pcell may be configured to the terminal by using the RRC configuration signaling RRCConnectionSetup. Terminal 705 configures the Pcell. The terminal reports PDSCH aggregation capability to eNB 710 at step 724. Here the PDSCH aggregation capability is to support receiving PDSCH from m carriers simultaneously.

After receiving the PDSCH aggregation capability report, the eNB determines which Scells need to be assigned at step 726. Then eNB may use an RRC configuration signaling to configure carriers as serving cells of the terminal, the total number of carriers could be greater than m−1 at this step, and then the total number of carriers at steps 722 and 726 would be greater than m. For example, the Scells may be configured to the terminal, using a RRC configuration signaling RRCConnectionReconfiguration, based on Scell add/release information elements, and generally the time scales are a few tens of milliseconds to about a hundred milliseconds for the configuration. Usually, high layer signaling, such as RRC signaling, may be referred to as slow signaling since it involves information sent in downlink control information (DCI) as well as a message encoded in a packet payload, which may take a significant amount of time to prepare, transmit, decode, and complete the associated operations, and RRC signaling is more relevant to system configurations which generally should not be changed too often.

At step 726 of FIG. 7, an RRC configuration signaling is introduced as an example to configure carriers. In another example, the eNB may use multiple configuration signaling to configure the carriers, for example, 3 carriers are configured at first time by using a first configuration signaling, 5 carriers are configured at second time by using a second configuration signaling, and so on. After receiving the RRC configuration signaling, the terminal performs associated radio configuration procedure at step 728, the procedure establishing the more than m carriers as serving cells of the terminal.

At step 730, the eNB instructs the terminal to perform RRM measurements for Scells via at least a RRC signaling. The eNB can instruct both CSI measurements and the RRM measurements at step 730, or instruct the CSI measurements via another signaling. A number of Scells to be instructed for RRM measurements at step 730 may be less or equal to a number of Scells assigned at step 726. Similarly, a number of Scells to be instructed for CSI measurements may be less or equal to a number of Scells assigned at step 726.

The terminal performs and reports the RRM measurements of the more than m carriers at step 732. The terminal may report the RRM measurements in accordance with a RRM measurement reporting instruction received from the eNB. The RRM measurement reporting instruction may be received with the RRM measurement instruction, or may be received via another RRC signaling from the eNB. The terminal is required to measure many system carriers, or even all carriers. The connections to all the configured carriers need to be maintained (including coarse tracking and RRM measurements) by the terminal, e.g., the terminal performs RRM measurements based on reference signals and/or synchronization signals (e.g. DRS) for these carriers. The terminal maintains coarse time/frequency synchronization with these carriers. Coarse synchronization/tracking (based on DRS or aperiodic DRS on demand or quasi-co-located RS on a different carrier) may be sufficient. The measurements may be done in a configured measurement gap, or per network request (according to a network indication of measurement gap via a fast signaling or an indication/trigger of RRM measurement report request via a fast signaling).

Take m=5 as an example, for the terminal configured with more carriers than which it can receive PDSCH simultaneously from, there are some options for the RRM measurements, depending on the terminal capability. These options may be combined.

In a first, the terminal performs RRM measurements on configured CCs without using gaps. For example, if a terminal is capable of receiving from 6 CCs simultaneously but configured with 10 CCs, it may be configured to receive PDSCH from at most 5 CCs at the same time, leaving extra capabilities to receive from any other CCs over time. Since performing the RRM measurements of a CC does not require continuous reception from the CC, the extra capabilities may be used by the terminal to cycle through other CCs for RRM measurements. For another example, a terminal may be capable of wideband receiving on a band in addition to its PDSCH receiving capability on a subset of CCs of the band, so the terminal can perform RRM measurements on all CCs of the band. Terminal operating according to this option are required to have an Radio Frequency (RF) capability of supporting RRM measurements but not an RF capability of receiving from all configured CCs simultaneously.

In a second, the terminal performs RRM measurements on some configured CCs using gaps. The configured measurement gap is introduced to perform RRM measurements for neighbor cell on the different frequencies then the currently connected cells in the gap. During this gap the terminal will not listen or transmit from/to some or all of the serving cells. The gap (for example, 6 ms) provides the terminal sufficient time to change frequency, make a measurement, and switch back to the active channel. The terminal can get the measurement gap configuration from a RRC configuration signaling RRCConnectionReconfiguration while connecting to the network. An Information Element (IE) contains the measurement gap could be MeasGapConfig. The configured measurement gap may be periodic or aperiodic. For RRM measurements, the measurement gap configuration can be called as RRM measurement gap configuration. For CSI measurements, the measurement gap configuration can be called as CSI measurement gap configuration. Usually, the gap may be 6 milliseconds for RRM measurement, and can be shorter than 6 milliseconds for CSI measurement. For example, the terminal may be receiving from 5 CCs out of the configured 10 CCs, but for every x subframes, the terminal interrupts on the 5 receiving CCs and switches to the other 5 CCs for RRM measurements for several subframes. Alternatively, the terminal may receive a trigger from the network regarding a RRM measurement opportunity on one or more of the other 5 CCs and/or a RRM measurement report opportunity (associated with the report opportunity there has to be a RRM measurement opportunity, and the timings for switching/measurement/reporting are specified such as in a standard).

In a third, the terminal and network rely on alternative measurements for some configured CCs. For example, if the terminal is configured with 10 CCs but it can receive from at most 5 CCs at the same time, the network may not configure the terminal to report RRM measurements for some CCs, but rely on Reference Signal Received Power (RSRP) measurements for other CCs within the same band since generally the RSRP on one CC can be derived from the RSRP on an intra-band CC. Though Reference Signal Received Quality (RSRQ) is not available for these CCs, the network generally has reasonable estimates of the interference for these CCs through sensing and/or network side information exchange.

Figure 8A:
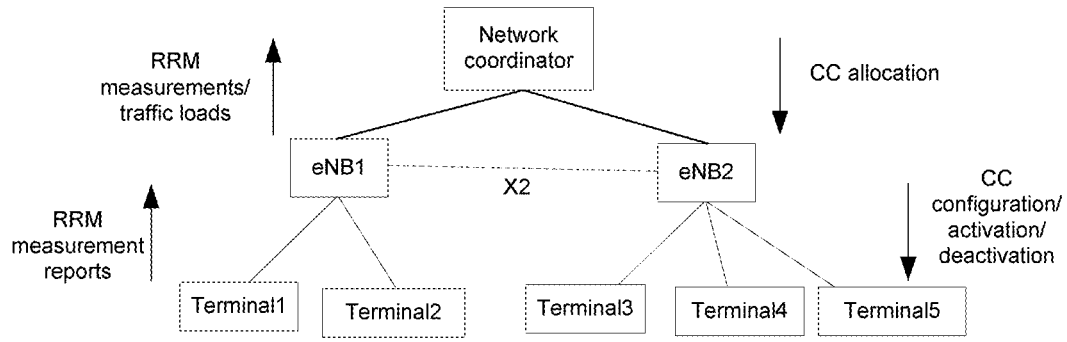
FIG. 8a illustrates an example of a wireless network including a network coordinator.
Figure 8B:
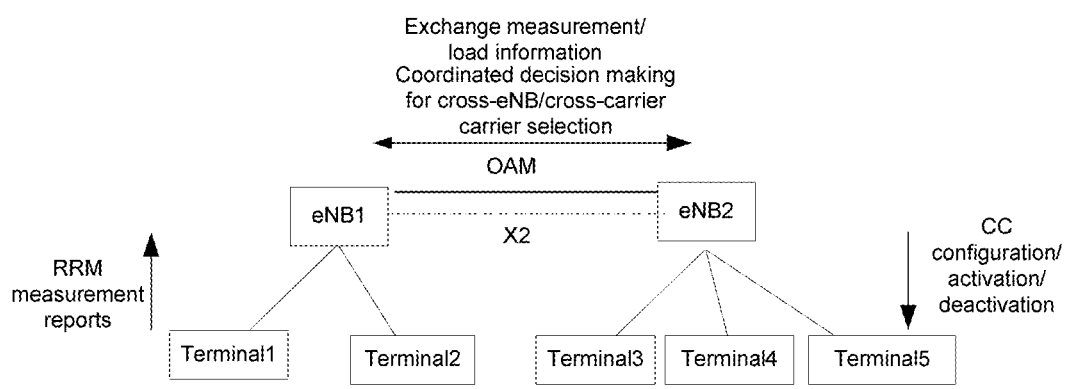
FIG. 8b illustrates another example of a wireless network at lease including eNB1 and eNB2.

When receiving the RRM measurement report at step 732, the eNB determines which CCs need to be activated at step 734. Or, the eNB may adaptively select a subset of carrier resources to be used for the terminal at step 734. Take FIG. 8a as one example, there is a network coordinator in the system at FIG. 8a. The network coordinator collects RRM measurement reports from different eNBs. Based on the RRM measurement reports, the network coordinator performs CC allocation to eNBs, and then the eNBs performs CC configuration, activation, and/or deactivation taking into consideration of the CC allocation decision made by the coordinator. Take FIG. 8b as another example, eNB1 exchanges measurement/load information with eNB2 via operations, administration and maintenance (OAM). And then, eNB1 and eNB2 make coordinated decision on cross-eNB/cross-carrier carrier selection. Finally, the eNB selects some carriers at step 734, and the number of carriers selected at step 734 is greater than m. For the carriers that need to be activated, the eNB sends an activation command to the terminal, such as via a MAC signaling; and for carriers that do not need to be activated, the eNB sends a deactivation command to the terminal such as via a MAC signaling, or the eNB relies on the expiry of sCellDeactivationTimer, at step 736. If a cell is not selected for any terminal, it may be turned off and transmit only in a discovery burst (discovery RS burst, or DRS burst). If a cell is selected, the cell has to be on or turned on. The transition time is desirable to be as short as possible. The terminal activates the carriers selected by the eNB. The terminal may need to maintain a more accurate tracking and CSI measurements for the carriers activated by the terminal at step 738, and then the terminal reports CSI measurements to eNB at step 740. The terminal may perform the CSI measurements on the activated carriers in accordance with the CSI measurement configuration received from the eNB. The CSI measurement configuration may be received with the RRM measurement configuration at step 730, or may be received via another RRC signaling from the eNB. The terminal may report the CSI measurements in accordance with a CSI measurement reporting configuration from the eNB. The CSI measurement reporting configuration may be received with the RRM measurement reporting configuration, or with the CSI measurement configuration, or may be received via another RRC signaling from the eNB. If the simultaneous tracking/measuring capability of the terminal is larger than m and is known to the eNB, then the terminal can track and measure greater than m carrier resources at the same time, without using CSI measurement gap or above options generalized to CSI measurements. Otherwise, CSI measurement gap may be used, or the terminal is left with extra monitoring capability for CSI measurements on other CCs via proper network indications (The CSI measurements is similar as the RRM measurements described above).

Generally when receiving the CSI measurement report (i.e., information related to the channel and/or interference measurement), the eNB performs carrier selection accordingly. In another example, the eNB may adaptively select carrier. The eNB selects a first subset of carriers which are scheduled for data transmissions. The number of carriers selected at step 742 should be less or equal m, because the total number of carriers that actually carry PDSCH at the same time may be limited to terminal's simultaneous data receiving capability. For the carriers that need to be monitored, the eNB sends a monitoring command to the terminal, such as via a DCI signaling at step 744. When terminal receives the monitoring command, the terminal can buffer data received from eNB. The eNB may send control command via PDCCH or EPDCCH, or send data via PDSCH to the terminal within the first subset at step 746. To monitor the carriers within the first subset, the terminally receives the PDCCH to process the downlink control information (DCI) to obtain the modulation, coding, etc. information for the PDSCH carrying data.

As discussed in FIG. 4, the load and/or interference situations may be changed. The eNB selects a second subset of carriers to be monitored by the terminal at step 762 when the load and/or interference situations are changed. The eNB can select the second subset based on CSI measurements at step 740. If the eNB receives another CSI measurement report from the terminal at step 760, the eNB can select the second subset based on CSI measurement report at step 760, or other information. The number of carriers selected at step 762 should be less or equal m, because the total number of carriers that actually carry PDSCH at the same time may be limited to terminal's simultaneous data receiving capability. For the carriers that need to be monitored, the eNB sends a monitoring command to the terminal, such as via a DCI signaling at step 764. When terminal receives the monitoring command, the terminal can buffer data received from eNB. The eNB may send a control command via (E)PDCCH and send data via PDSCH to the terminal within the second subset at step 766. At least a carrier frequency of the first subset is different from a carrier frequency of the second subset.

Figure 9:
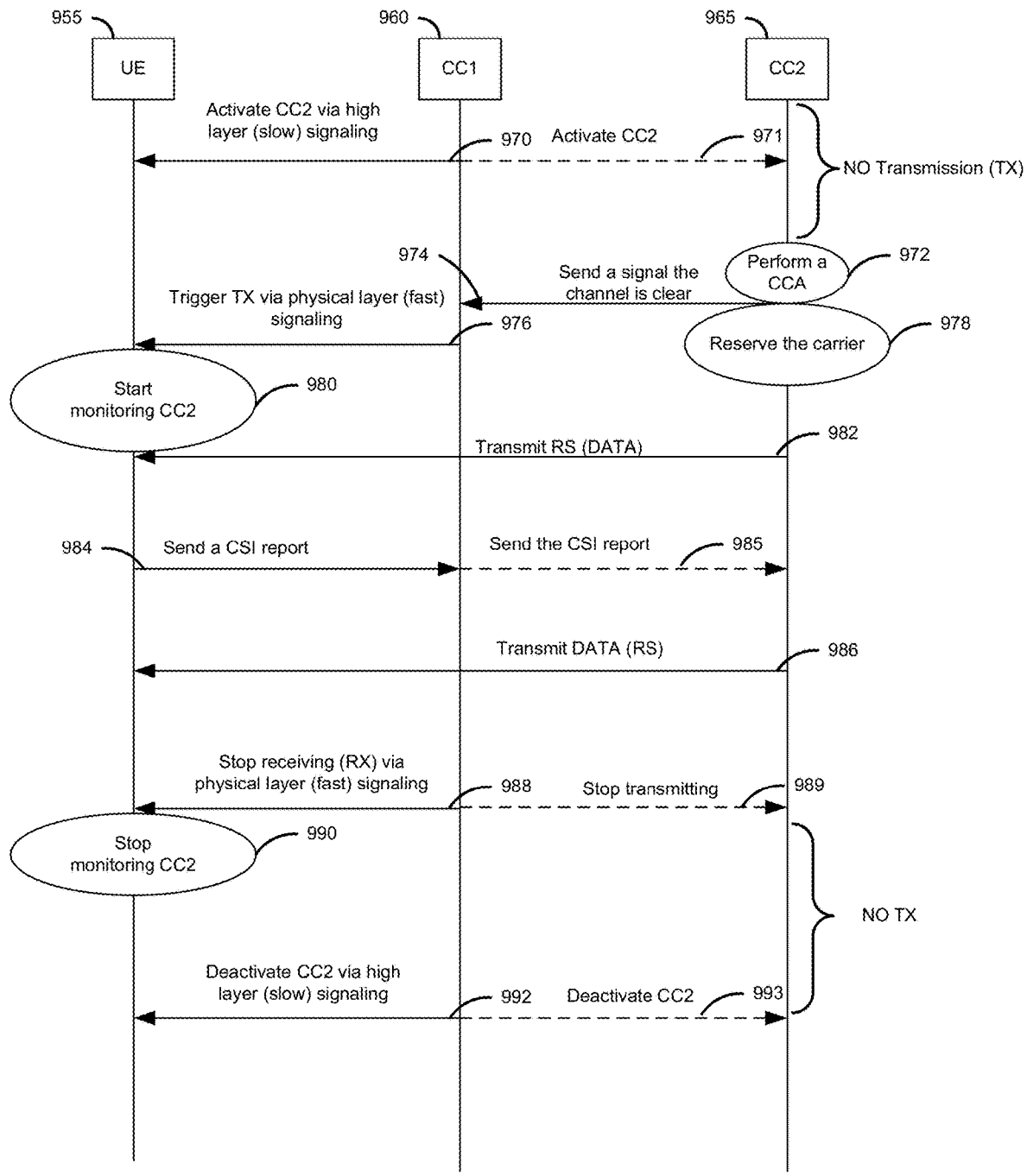
FIG. 9 illustrates a message exchange and processing diagram 900 highlighting a example design of CSI measurement/feedback on demand for link adaptation.

For the first subset is different from the second subset, the terminal needs to stop monitoring the CC in the first subset but not in the second subset, and start to monitor the CC in the second subset but not in the first subset. For example, subset 1 contains SCells 1-4, and subset 2 contains SCells 3-6. If switching from subset 1 to subset 2, the terminal need to stop monitoring SCells 1 and 2, and keep monitoring SCells 3 and 4, and start to monitor SCells 5 and 6. As an illustrative example, the eNB may determine that CC2 965 is becoming suitable for the terminal at subframe n+1. FIG. 9 illustrates a message exchange and processing diagram 900 highlighting an example design of CSI measurement/feedback on demand for link adaptation in a wireless network with at least one unlicensed communications carrier and one licensed communications carrier. Message exchange and processing diagram 900 includes messages exchange and processing by a terminal 955, a CC1 960, and a CC2 965. In FIG. 9, CC1 960 may be a carrier that terminal 955 is monitoring as well as a cell associated with the carrier (e.g., CC1 960 may be Pcell or an activated Scell) and CC2 965 is an opportunistically on/off cell and has fast backhaul with CC1 960. CC1 960 may use a licensed communications carrier, while CC2 965 may use an unlicensed communications carrier. Although the discussion focuses on CC1 960 and CC2 965 being separate entities connected via a backhaul, CC1 960 and CC2 965 may also be co-located in a single device.

Since it normally does not communicate continuously, CC2 965 may be in a sleep or reduced power state. CC1 960 may inform terminal 955 that it is activating CC2 965 (shown as step 970). As an illustrative example, CC1 960 may activate CC2 965 via a signaling over the backhaul connecting CC2 965 to CC1 960 (shown as dashed line 971). CC1 960 may also perform high layer signaling (which may be characterized as slow signaling) with terminal 955 to inform terminal 955 that CC2 965 is being activated. Since it is operating in the unlicensed communications band, CC2 965 must check to determine if the carrier in that unlicensed band is clear before it can transmit. In other words, CC2 965 performs a clean channel assessment (CCA) (step 972). If it is operating in the licensed communications band, CC2 965 does not need to check if the carrier in that unlicensed band is clear before it can transmit, and correspondingly does not need to perform a CCA at step 972. When CC2 965 determines that the carrier is clear, CC2 965 may send a notice to CC1 960 that the channel is clear (shown as step 974). But, if CC1 960 and CC2 965 are co-located in a single device, CC2 965 may not send channel clear signal at step 974 to CC1 960 although it is operating in the unlicensed communications band. The signaling that the channel is clear may be performed over the backhaul between CC2 965 and CC1 960. CC1 960 may signal a trigger to terminal 955 (shown as step 976). The trigger may be signaled using physical (PHY) layer signaling (which may be characterized as fast signaling), such as in the DCI, for example. After determining that the carrier is clear, CC2 965 may reserve the carrier to transmit a reference signal (RS) (step 978). CC2 965 may also start cellular communications, such as transmission of data, using a hybrid automatic repeat request (HARD) process to manage the transmission of data, and the like.

Terminal 955 may start monitoring CC2 965 (step 980). CC2 965 may start RS (and possibly data) transmission (shown as step 982). Terminal 955 may measure a communications channel between itself and CC2 965 using the RS. In other words, terminal 955 may perform a channel measurement. Terminal 955 may generate and send a CSI report in accordance with the channel measurement to CC1 960 (shown as step 984). Since CC1 960 and CC2 965 are connected via a backhaul, CC1 960 may signal CC2 965 the CSI report (shown as dashed line 985). CC2 965 may use information included in the CSI report (i.e., information related to the channel measurement) and perform link adaptation. CC2 965 may transmit data (and possibly a RS) to terminal 955 (shown as step 986).

CC1 960 signals terminal 955 to stop receiving (shown as step 988). The signaling may be performed in the physical layer, therefore, it may be fast signaling. CC1 960 may also signal CC2 965 to stop transmitting (shown as dashed line 989). Terminal 955 may stop monitoring CC2 965 (step 990). CC1 960 may deactivate CC2 965 by signaling over the backhaul (shown as dashed line 993) and inform terminal 955 over high layer signaling regarding the deactivation of CC2 965 (shown as step 992).

CC1 960 may use a licensed communications carrier, while CC2 965 may use an unlicensed communications carrier at one example of FIG. 9. CC1 960 may use an unlicensed communications carrier, while CC2 965 may use a licensed communications carrier; or both CC1 960 and CC2 965 use licensed communications carriers; or both CC1 960 and CC2 965 use unlicensed communications carriers in other examples.

Figure 10:
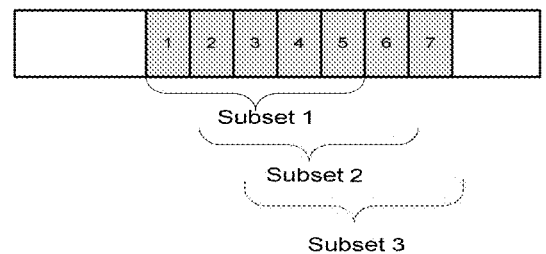
FIG. 10 shows the principle of the number of CCs configuration beyond the terminal's capability.

As a result, the number of carriers in the first subset and the second subset may be greater than m which is terminal's simultaneous data receiving capability. The extension of the framework beyond m carriers is widely regarded as desirable and beneficial, as it provides operators an opportunity to more efficiently utilize all the available spectrum resources for the ever increasing communication demands. The carriers can be configured in different bands. In each band the number of carriers that can be configured is more than m. At different times the eNB can select different subsets of CCs for simultaneous reception or transmission (up to the terminal's capability m). Configuring more carriers potentially to be used allows access to more carriers over time and better carrier utilization according to the measurement results or the change of services. FIG. 10 shows the principle of the number of CCs configuration beyond terminal's capability. Take m=5 as an example, at subset 1, 5 carriers (CCs 1-5) are used for terminal's simultaneous data receiving; at subset 2, another 5 carriers (CCs 2-6) are used for terminal's simultaneous data receiving; at subset 3, another 5 carriers (CCs 3-7) are used for terminal's simultaneous data receiving. The total number of CCs are greater than 5, thus beyond m carriers. The carriers may be grouped, e.g., there may be a group of carriers that the terminal always monitors, and this group shall include the PCell. There may be several groups of carriers that the terminal may switch among. For example, group 0 may contain the PCell, group 1 may contain SCells 1-4, group 2 may contain SCells 3-6, group 3 may contain SCells 7-10. The terminal switches only among groups 1-3. Therefore, the switching indication may be group-specific, i.e., the indication may not be CC-specific, but it specifies to switch from one group to another, which helps reduce signaling overhead. The indication may be the monitoring signaling, but it can also be applied to the MAC signaling for activation/deactivation. The grouping may be the same or similar to aperiodic CSI triggering mechanism.

Moreover, in the embodiments discussed above, more than m carriers are configured before selection/switching via RRC signaling (which may be characterized as slow signaling). As a result, the fast carrier selection/switching within the more than m carriers may be signaled using physical layer signaling (which may be characterized as fast signaling), such as in the DCI, for example. That means fast carrier selection/switching can be supported, and the switching process does not need to involve RRC signaling for carrier switching. Physical layer signaling may be referred to as fast signaling since it involves information sent in the DCI, which may be transmitted and decoded in a short amount of time. Usually, it takes several milliseconds to finish the carrier selection/switching by using physical layer signaling. Compared to the carrier selection/switching by using RRC signaling (generally time scales of a few tens of milliseconds to about a hundred milliseconds) every time, the time consumed of carrier selection/switching in the embodiments are much reduced, especially with a demand of frequent carrier selection/switching.

Figure 11:
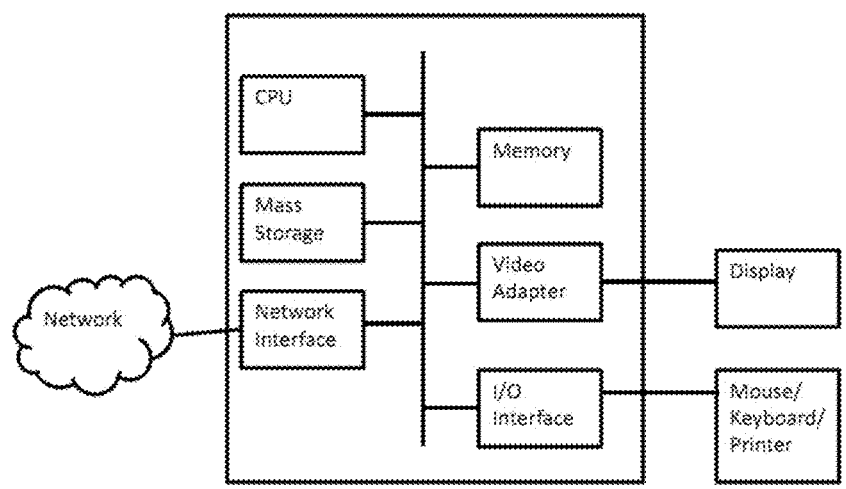
FIG. 11 illustrates a computing platform that may be used for implementing, for example, the devices and methods described herein, in accordance with an embodiment.

FIG. 11 is a block diagram of an example of a computing device 1100 to implement embodiments according to the present invention. The device 1100 can be implemented as the terminal or as the base station, such as those described in conjunction with the above Figures. Specific devices may utilize all of the components shown, or only a subset of the components, and levels of integration may vary from device to device. Furthermore, a device may contain multiple instances of a component, such as multiple processing units, processors, memories, transmitters, receivers, etc. The computing device 1100 may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for communicating with a terminal by a base station in a wireless network the method comprising:
    sending, by the base station, an activation command to the terminal that instructs the terminal to activate a set of carriers, a number of carriers in the set of activated carriers being greater than a maximum number of carriers (m carriers) over which the terminal is capable of simultaneously receiving signals;
    sending, by the base station, a first physical-layer signaling to the terminal that includes a first monitoring command instructing the terminal to monitor a first subset of carriers from the set of activated carriers during a first time period, a number of carriers in the first subset of carriers being less than or equal to the m carriers; and
    sending, by the base station, a second physical-layer signaling to the terminal that includes a second monitoring command instructing the terminal to monitor a second subset of carriers from the set of activated carriers during a second time period, a number of carriers in the second subset of carriers being less than or equal to the m carriers, at least one carrier in the second subset of carriers being excluded from the first subset of carriers.

2. The method of claim 1, the method further comprising:
    receiving, by the base station from the terminal, a channel state information (CSI) or a radio resource management (RRM) measurement report for carriers in the set of activated carriers from the terminal; and
    selecting, by the base station, the first subset of carriers and the second subset of carriers based on the CSI or the RRM measurement report.

3. The method of claim 1, the method further comprising:
    sending an instruction via a radio resource control (RRC) signaling to instruct the terminal to perform radio resource management (RRM) measurement;
    receiving a RRM measurement report from the terminal; and
    selecting, by the base station, the set of activated carriers for configuring RRC connections between the base station and the terminal based on the RRM measurement report.

4. The method of claim 3, the method further comprising:
    selecting, by the base station, the set of activated carriers for configuring the RRC connections based on a coordinated decision between the base station and at least one other base station or a network coordinator in the wireless network.

5. The method of claim 1, wherein a carrier frequency in the first subset of carriers is in a band licensed for cellular communication, and wherein a carrier frequency in the second subset of carriers is in a band reserved for unlicensed communication.

6. The method of claim 1, the first physical-layer signaling and the second physical-layer signaling are downlink control information (DCI) signaling carried by physical downlink control channel (PDCCH) or by enhanced PDCCH (EPDCCH).

7. The method of claim 1, wherein the activation command instructs the terminal to configure the set of carriers for communication between the terminal and the wireless network.

8. A base station for communicating with a terminal in a wireless network, comprising:
    a processor; and
    a memory coupled to the processor and storing programming for execution by the processor;
    send an activation command to the terminal that instructs the terminal to activate a set of carriers, a number of carriers in the set of activated carriers being greater than a maximum number of carriers (m carriers) over which the terminal is capable of simultaneously receiving signals;
    send a first physical-layer signaling to the terminal that includes a first monitoring command instructing the terminal to monitor a first subset of carriers from the set of activated carriers during a first time period, a number of carriers in the first subset of carriers being less than or equal to the m carriers; and
    send a second physical-layer signaling to the terminal that includes a second monitoring command instructing the terminal to monitor a second subset of carriers from the set of activated carriers during a second time period, a number of carriers in the second subset of carriers being less than or equal to the m carriers, at least one carrier in the second subset of carriers being excluded from the first subset of carriers.

9. The base station of claim 8, wherein the programming further includes instructions to:
    receive, from the terminal, a channel state information (CSI) or a radio resource management (RRM) measurement report for carriers in the set of activated carriers from the terminal; and select, by the base station, the first subset of carriers and the second subset of carriers based on the CSI or the RRM measurement report.

10. The base station of claim 8, wherein the programming further includes instructions to:
send an instruction via a radio resource control (RRC) signaling to instruct the terminal to perform radio resource management (RRM) measurement;
receive a RRM measurement report from the terminal; and
select the set of activated carriers for configuring RRC connections between the base station and the terminal based on the RRM measurement report.

11. The base station of claim 10, wherein the programming further includes instructions to:
selecting, by the base station, the set of activated carriers for configuring the RRC connections based on a coordinated decision between the base station and at least one other base station or a network coordinator in the wireless network.

12. The base station of claim 8, wherein a carrier frequency in the first subset of carriers is in a band licensed for cellular communication, and wherein a carrier frequency in the second subset of carriers is in a band reserved for unlicensed communication.

13. The base station of claim 8, the first physical-layer signaling and the second physical-layer signaling are downlink control information (DCI) signaling carried by physical downlink control channel (PDCCH) or by enhanced PDCCH (EPDCCH).

14. A method for communicating with a base station by a terminal in a wireless network, the method comprising:
receiving, by the terminal, an activation command from a base station that instructs the terminal to activate a set of carriers;
activating, by the terminal, the set of activated carriers in accordance with the activation command, a number of carriers in the set of activated carriers being greater than a maximum number of carriers (m carriers) over which the terminal is capable of simultaneously receiving signals;
receiving, by the terminal, a first physical-layer signaling from the base station that includes a first monitoring command instructing the terminal to monitor a first subset of carriers from the set of activated carriers during a first time period, a number of carriers in the first subset of carriers being less than or equal to the m carriers;
monitoring, by the terminal, carriers in the first subset of carriers during the first time period;
receiving, by the terminal, a second physical-layer signaling from the base station that includes a second monitoring command instructing the terminal to monitor a second subset of carriers from the set of activated carriers during a second time period, a number of carriers in the second subset of carriers being less than or equal to the m carriers, at least one carrier in the second subset of carriers being excluded from the first subset of carriers; and
monitoring, by the terminal, carriers in the second subset of carriers during the second time period.

15. The method of claim 14, further comprising:
receiving, by the terminal, radio resource control (RRC) signaling from the base station that includes serving cell configurations for the set of activated carriers, wherein the first subset of carriers and the second subset of carriers are monitored in accordance with the serving cell configurations for the set of activated carriers.

16. The method of claim 14, further comprising:
receiving, by the terminal, a radio resource management (RRM) measurement instruction associated with the set of activated carriers from the base station;
performing, by the terminal, RRM measurements on the set of activated carriers in accordance with the RRM measurement instruction; and
reporting, by the terminal, the RRM measurements to the base station, the RRM measurements being reported prior to the terminal receiving the activation command from the base station.

17. The method of claim 14, further comprising:
receiving, by the terminal, a channel state information (CSI) measurement instruction associated with the set of activated carriers from the base station;
performing, by the terminal, CSI measurements on the set of activated carriers in accordance with the CSI measurement instruction; and
reporting, by the terminal, the CSI measurements to the base station, the CSI measurements being reported prior to the terminal receiving the activation command from the base station.

18. The method of claim 17, wherein the CSI measurements on the set of activated carriers are performed using gaps in accordance with a CSI measurement gap configuration received from the base station.

19. The method of claim 17, wherein the CSI measurements on the set of activated carriers are performed using gaps in accordance with a trigger associated with a CSI measurement.

20. A terminal comprising:
a processor; and
a non-transitory computer readable storage medium storing programming for execution by the processor, the programming including instructions to:
receive an activation command from a base station that instructs the terminal to activate a set of carriers;
activate the set of activated carriers in accordance with the activation command, a number of carriers in the set of activated carriers being greater than a maximum number of carriers (m carriers) over which the terminal is capable of simultaneously receiving signals;
receive a first physical-layer signaling from the base station that includes a first monitoring command instructing the terminal to monitor a first subset of carriers from the set of activated carriers during a first time period, a number of carriers in the first subset of carriers being less than or equal to the m carriers;
monitor carriers in the first subset of carriers during the first time period;
receive a second physical-layer signaling from the base station that includes a second monitoring command instructing the terminal to monitor a second subset of carriers from the set of activated carriers during a second time period, a number of carriers in the second subset of carriers being less than or equal to the m carriers, at least one carrier in the second subset of carriers being excluded from the first subset of carriers; and
monitor carriers in the second subset of carriers during the second time period.

21. The terminal of claim 20, wherein the programming further includes instructions to:

receive radio resource control (RRC) signaling from the base station that includes serving cell configurations for the set of activated carriers, wherein the first subset of carriers and the second subset of carriers are monitored in accordance with the serving cell configurations for the set of activated carriers.

22. The terminal of claim 20, wherein the programming further includes instructions to:
  receive a radio resource management (RRM) measurement instruction associated with the set of activated carriers from the base station;
  perform RRM measurements on the set of activated carriers in accordance with the RRM measurement instruction; and
  report the RRM measurements to the base station, the RRM measurements being reported prior to the terminal receiving the activation command from the base station.

23. The terminal of claim 20, wherein the programming further includes instructions to:
  receive a channel state information (CSI) measurement instruction associated with the set of activated carriers from the base station;
  perform CSI measurements on the set of activated carriers in accordance with the CSI measurement instruction; and
  report the CSI measurements to the base station, the CSI measurements being reported prior to the terminal receiving the activation command from the base station.

24. The terminal of claim 23, wherein the CSI measurements on the set of activated carriers are performed using gaps in accordance with a CSI measurement gap configuration received from the base station.

25. The terminal of claim 23, wherein the CSI measurements on the set of activated carriers are performed using gaps in accordance with a trigger associated with a CSI measurement.

26. A method for communicating with a terminal by a base station in a wireless network the method comprising:
  sending, by the base station, an activation command to the terminal that instructs the terminal to configure a set of carriers for communication between the terminal and the wireless network, a number of carriers in the set of configured carriers being greater than a maximum number of carriers (m carriers) over which the terminal is capable of simultaneously receiving data;
  sending, by the base station, a first physical-layer signaling to the terminal that includes a first monitoring command instructing the terminal to monitor a first subset of carriers from the set of configured carriers during a first time period, a number of carriers in the first subset of carriers being less than or equal to the m carriers; and
  sending, by the base station, a second physical-layer signaling to the terminal that includes a second monitoring command instructing the terminal to monitor a second subset of carriers from the set of configured carriers during a second time period, a number of carriers in the second subset of carriers being less than or equal to the m carriers, at least one carrier in the second subset of carriers being excluded from the first subset of carriers.

\* \* \* \* \*